Figure 1:
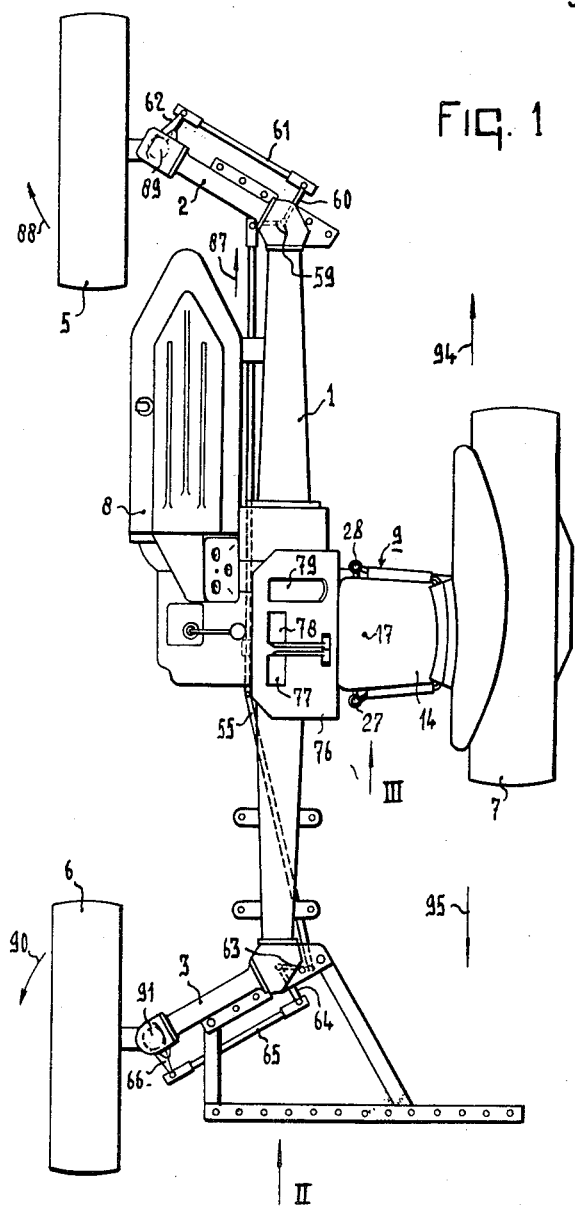

April 16, 1963 C. VAN DER LELY 3,085,644
TRACTOR CONTROL AND DRIVING MEANS THEREFOR
Filed March 28, 1960 5 Sheets-Sheet 1

April 16, 1963 C. VAN DER LELY 3,085,644
TRACTOR CONTROL AND DRIVING MEANS THEREFOR
Filed March 28, 1960 5 Sheets-Sheet 2
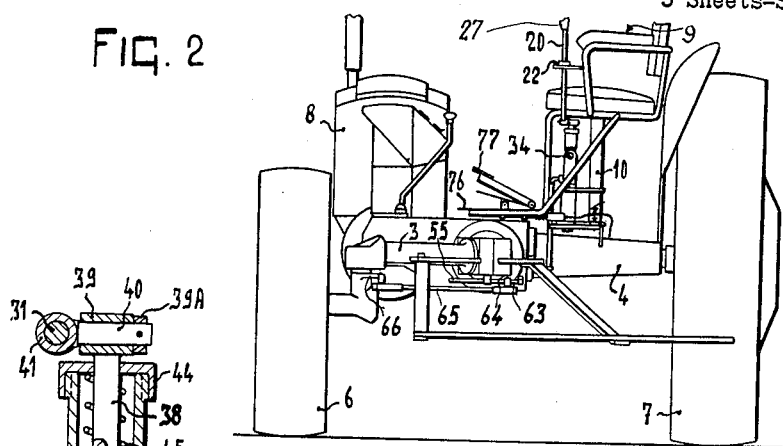
FIG. 2
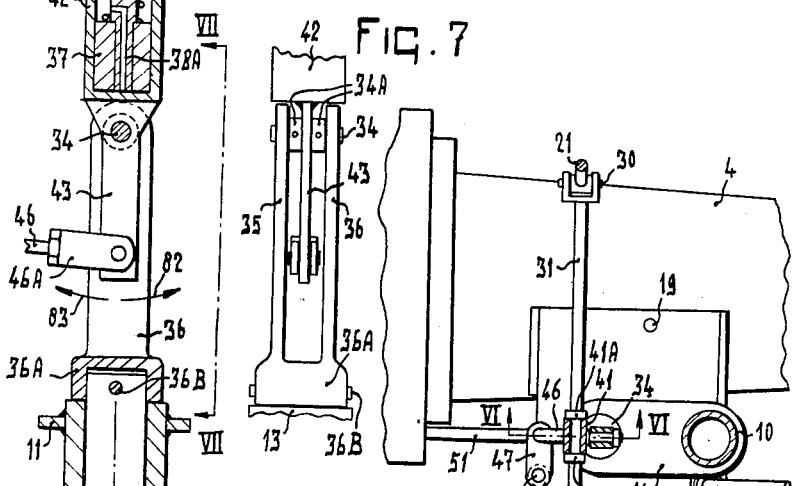
FIG. 6  FIG. 7  FIG. 5
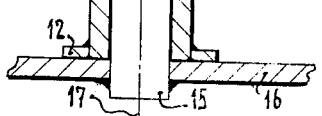
INVENTOR.
Cornelis van der Lely
BY

April 16, 1963 C. VAN DER LELY 3,085,644
TRACTOR CONTROL AND DRIVING MEANS THEREFOR
Filed March 28, 1960 5 Sheets-Sheet 3

Cornelis van der Lely INVENTOR
BY
Mason, Mason & Albright

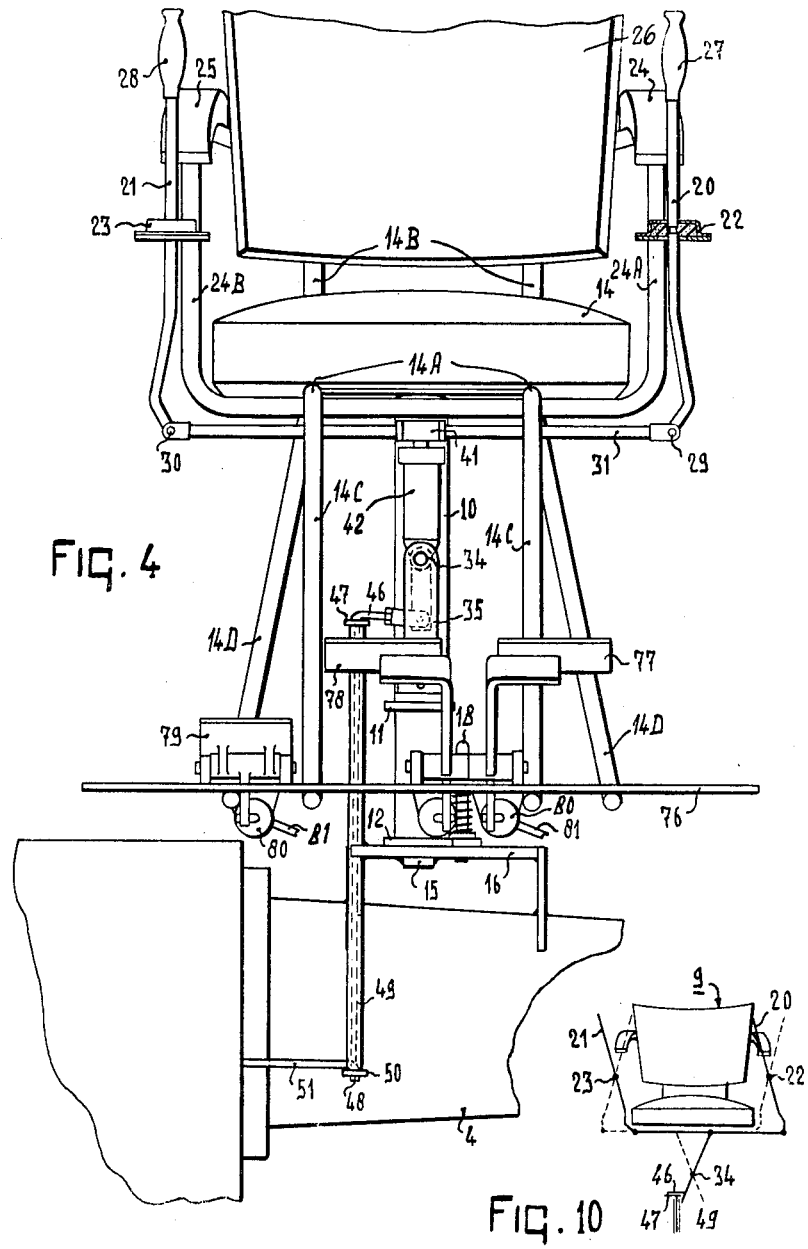

April 16, 1963   C. VAN DER LELY   3,085,644
TRACTOR CONTROL AND DRIVING MEANS THEREFOR
Filed March 28, 1960   5 Sheets-Sheet 5

INVENTOR.
Cornelis van der Lely
BY
Mason, Mason & Albright

United States Patent Office 3,085,644
Patented Apr. 16, 1963

3,085,644
TRACTOR CONTROL AND DRIVING
MEANS THEREFOR
Cornelis van der Lely, Zug, Switzerland, assignor to Patent Concern N.V., Willemstad, Curacao, Netherlands, a company of the Netherlands
Filed Mar. 28, 1960, Ser. No. 18,056
Claims priority, application Netherlands Apr. 21, 1959
13 Claims. (Cl. 180—77)

This invention relates to a tractor comprising at least one steerable ground wheel, which is adapted to be actuated from a seat with the aid of steering control means, the seat together with the control means being adapted to turn about a vertical or substantially vertical hinge shaft and to be fixed in at least two positions, whilst a transmission mechanism coupling the control-means with the steerable ground wheel consists of two relatively rotatable parts, of which one part is adapted to turn with the seat and the second part occupies a fixed position relative to the tractor, when the seat is turned.

It is an object of the invention to provide a tractor or the like in which the possibility for making steering errors is much reduced.

In accordance with the invention the steering control means are coupled with the second part of said transmission mechanism by means of a coupling member which forms part of the first part of the transmission mechanism and which transfers the movement of the control-means to the second part of the transmission mechanism, the coupling member being displaceable by means of the control-means in two directions which are at least substantially at right angles to each other.

In accordance with a further aspect of the invention the control-means includes at least one control stick which is coupled with the second part of said transmission mechanism and which is adapted to turn with the seat, when the seat is turned out of a first position into a second position, whilst in the second position of the seat the control stick is adapted to move in a plane which is at least substantially parallel to a plane in which the control stick is movable, when the seat occupies its first position.

Figures 3, 9:
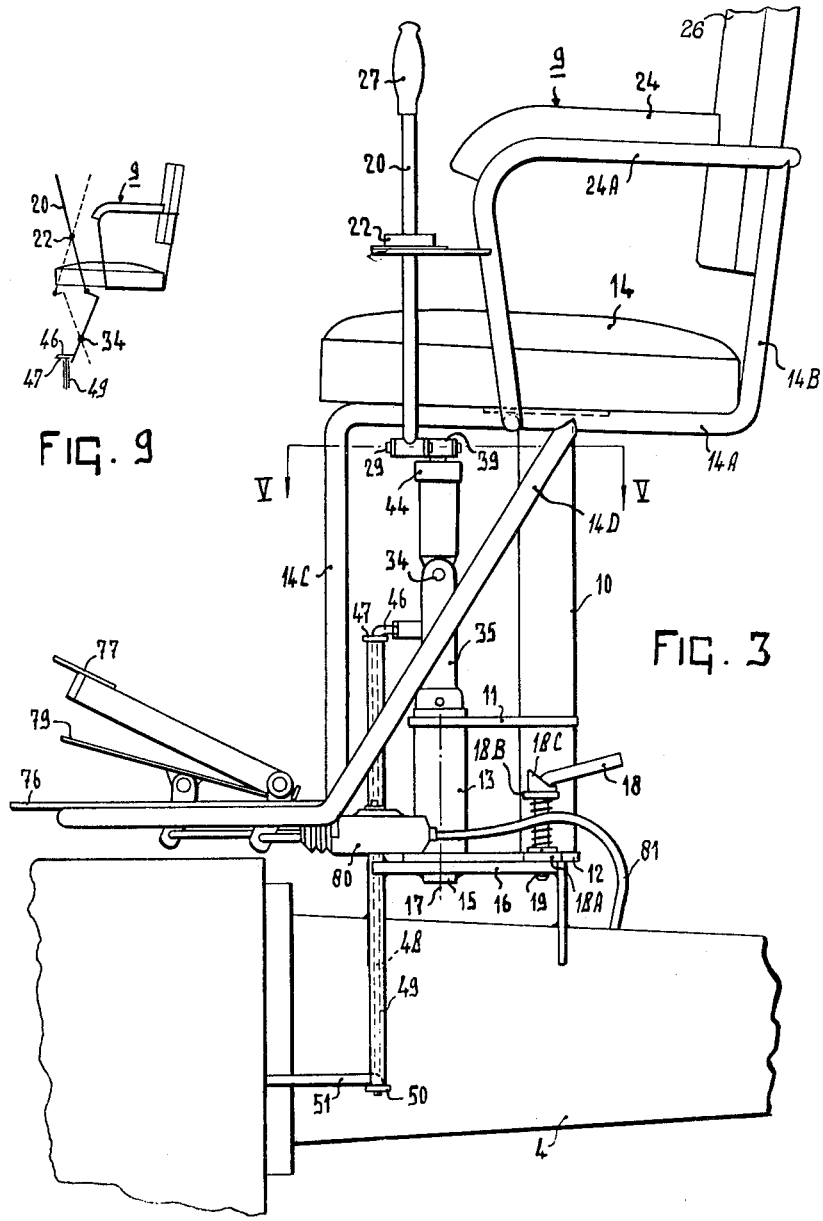
Figure 8:
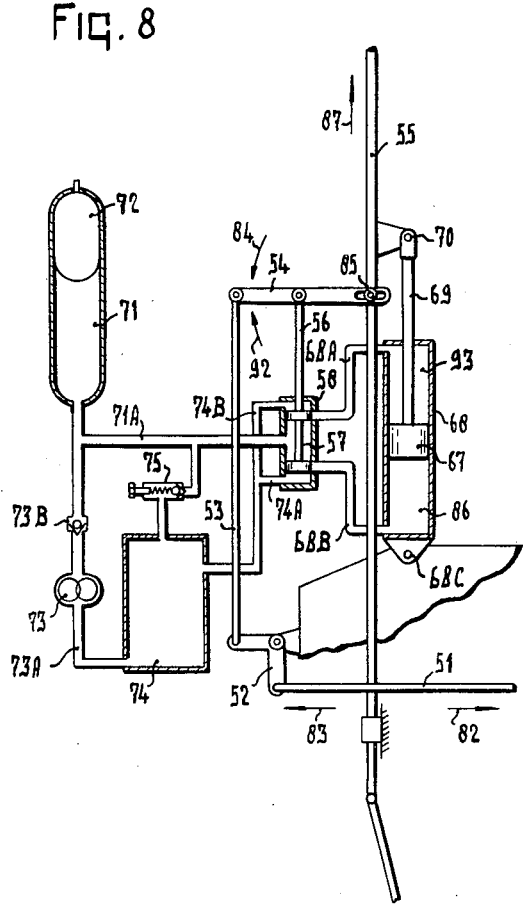

For a better understanding of the invention and to show how the same may be carried into effect, reference will now be made, by way of example, to the accompanying drawings in which:

FIGURE 1 is a plan view of a tractor embodying the invention,

FIGURE 2 is an end view corresponding to FIGURE 1 as seen in the direction of the arrow II, FIGURE 3 is an elevation to an enlarged scale of part of the tractor shown in FIGURE 1, as seen in the direction of the arrow III, FIGURE 4 is a view similar to FIGURE 3 but showing another position of the seat for the driver of the tractor, FIGURE 5 is a sectional plan view taken on the line V—V of FIGURE 3, FIGURE 6 is an enlarged sectional view taken on the line VI—VI of FIGURE 5, FIGURE 7 is a partial side view of FIGURE 6 as seen from the line VII—VII in FIGURE 6, FIGURE 8 is a diagram showing certain hydraulic mechanism, and FIGURES 9 and 10 are explanatory diagrams.

The tractor has a longitudinally extending, tubular, chassis principal 1, at either end of which, chassis members 2 and 3 are connected (see FIGURE 1). At about the centre of its length, the longitudinal chassis principal 1 has a laterally extending chassis member 4 (see FIGURE 2), the chassis members 2, 3 and 4 serving to support the ground wheels 5, 6 and 7 of the tractor. It will be noted that the ground wheels 5 and 6 lie on one side of the longitudinal centreline of the tractor whilst the ground wheel 7 lies on the other side thereof. The wheels 5 and 6 are respectively supported upon pins 89 and 91 which allow the wheels 5 and 6 to have steering movements imparted to them. The wheel 7 is not a steerable wheel. The tractor has an engine 8 which is located on the same side of the chassis principal 1 as are the ground wheels 5 and 6. The tractor has a seat structure 9 located on the side of the chassis principal 1 opposite that where the engine 8 is located, the seat structure 9 being arranged above the transverse chassis member 4.

The seat structure 9 includes a seat 14 which is mounted at the upper end of a pillar 10 (see FIGURE 3). Near its lower end, the pillar 10 has a pair of laterally extending arms 11 and 12 the ends of which are fixed upon the exterior of a bearing sleeve 13. The latter is turnably supported upon a vertical shaft 15 fixed in a plate 16, which is rigidly mounted upon the chassis member 4 with the aid of appropriate brackets. It will therefore be appreciated that the pillar 10 can be swung around the axis 17 of the shaft 15, the seat structure carried by the pillar thus being similarly movable. In FIGURE 1, a point 17 is indicated corresponding to the axis 17 shown in FIGURE 3. From FIGURE 1 it is apparent that the axis 17 about which the seat structure is swingable, passes through the upper surface of the seat 14 at a location well within the boundaries of such seat. The lower arm 12 fixed to the lower end of the pillar 10, carries a lug 18A and a similar lug 18B is fixed to the pillar 10 itself. The lugs 18A and 18B have aligned holes in which there is entered a locking pin 18. The latter is downwardly spring-urged so that the locking pin tends always to protrude beneath the lug 18A. The lug 18B fixedly carries a collar 18C the upper surface of which is canted. In FIGURE 3 the locking pin 18 is shown in an operative position. If the pin 18 is turned then it will be appreciated that the laterally bent portion of the pin will ride up the canted upper surface of the collar 18C and will cause the pin to be withdrawn against its spring-loading, to an inoperative position where it no longer protrudes beyond the lug 18A. In FIGURE 3 the pin 18 is shown entered in, and protruding through, a hole 19 formed in the plate 16. As appears from FIGURE 5, there are two further holes 19 in the plate 16. In the position of the seat structure shown in FIGURE 3 the pin 18 holds the seat in the position also shown in FIGURE 1 where the driver can be seated so as to face in a direction transverse to the longitudinal extent of the tractor. By releasing the locking pin 18, the seat structure may be swung in either direction about the axis 17 whereby the seat may be brought to either one of two settings in which the seat no longer lies transverse to the longitudinal extent of the tractor, but parallel thereto. The seat can be locked in its new setting by appropriately entering the pin 18 in one of the other holes 19 shown in FIGURE 5. In FIGURE 4 the seat structure is seen in one of these settings.

Steering control means are arranged upon the seat structure 9 so as to be bodily movable therewith. As appears best from FIGURE 4, the steering control means consist of control sticks 20 and 21. The seat structure 9 in addition to the seat 14, comprises a back rest 26 and arm rests 24 and 25. A pair of frame members 14A extend beneath the seat 14 and are continued upwardly as at 14B to form supports for the back rest 26. Further frame members 24A and 24B respectively serve to support the arm rests 24 and 25. Each frame member 24A and 24B carries fixedly a bearing 22, 23 for support of a respective control stick 20, 21. The bearings are of like construction and the bearing 22 is shown in section in FIGURE 4. It will be apparent that the bearing consists of a rigid container housing a block of resilient material. The container has holes at top and bottom through which the stick 20 can be entered, and the stick has a groove engaged by the block of resilient material housed within the container. It will therefore be understood that both the control sticks 20 and 21, whilst being supported by their bearings 22 and 23, can nevertheless be pivotally moved in any direction. The control sticks 20 and 21 have handles 27 and 28 at their upper ends, these handles being within easy reach of the tractor driver so that when his arms are resting upon the arm rests 24 and 25 he can grasp the handles 27 and 28.

As seen best in FIGURE 4, the lower end of each of the control sticks 20 and 21 is pivotally connected to either end of a coupling member formed by a rod 31 with the aid of pins 29 and 30, the rod 31 extending beneath the seat 14, with the pins 29 and 30 substantially parallel to the sides of the seat. At about its centre, the rod 31 has a freely turnable sleeve 41 mounted thereon and held in position with the aid of fixed collars 41A (see FIGURE 5). The sleeve 41 carries a laterally projecting pin 40 which is entered in a further sleeve 39 disposed at right-angles to the sleeve 41 (see FIGURE 6). The pin 40 is held in the sleeve 39 with the aid of a fixed collar 39A. The sleeve 39 is mounted at the upper end of a plunger rod 38, the plunger 37 of which is entered in a dashpot 42. The upper end of the dashpot is closed by a cap 44 against which bears a spring 45 the other end of which bears against the plunger 37. The plunger rod 38 is formed with a bleed hole 38A which extends from one side of the plunger to the other. The spring 45 serves normally to hold the plunger 37 at the bottom of the dashpot as shown in FIGURE 6, but it will be understood that the plunger can move upwardly in the dashpot against the action of the spring 45. The lower end of the dashpot 42 has a lever 43 fixed thereto (see also FIGURE 7). The lever 43 is mounted upon a pivot pin 34 with the aid of a pair of spacing collars 34A. The pivot pin 34 is held in the cheeks 35, 36 of a bracket the lower end of which is domed at 36A and is entered over the upper end of the fixed shaft 15. A pin 36B serves to anchor the bracket upon the shaft 15. It will be recalled that the shaft 15 is fixed to the plate 16 which is in turn fixedly mounted upon the transverse chassis member 4. Hence the pin 34 is effectively fixed in relation to the chassis of the tractor, the axis of such pin extending in the longitudinal direction of the chassis.

The lower free end of the lever 43 is pivotally connected with the aid of a bifurcated bracket 46A to a rod 46. As can be seen best in FIGURES 3 and 5, the rod 46 is down-turned at its free end and is entered in a hole formed at one end of an arm 47. The latter is fixedly mounted upon a rod 48 housed in a tube 49 fixed to the plate 16. The lower end of the rod 48 carries fixedly a further arm 50 the free end of which is formed with a hole for the entry therein of the down-turned end of a further rod 51.

The rod 51 controls hydraulic mechanism which is illustrated in FIGURE 8. The rod 51 extends to one arm of a bell-crank lever 52, the latter being rockably mounted upon a part of the chassis of the tractor. The other arm of the bell-crank lever is pivotally coupled to one end of a rod 53 the other end of which is pivotally connected to one end of a lever 54. Between its ends, the lever 54 is pivotally connected with the control rod 56 of a double spool valve 57 located in a housing 58. At either end of the double spool valve assembly 57 exhaust conduits 74A and 74B communicate with the housing 58, such conduits being connected to a reservoir tank 74 for hydraulic pressure medium. The latter is connected by a conduit 73A to a pump 73. The outlet side of the pump is connected via a non-return valve 73B to a pressure tank 71 the upper end of which contains a trapped gas cushion 72. A branch conduit 71A extends effectively from the pressure tank 71 to an inlet port of the housing 58 located between the two spools of the spool valve. A by-pass including a pressure relief valve 75 extends between the conduit 71A and the reservoir tank 74. The housing 58 has outlet conduits 68A and 68B extending to either end of a hydraulic ram cylinder 68 the piston 67 of which has a rod 69 pivotally attached at 70 to a bracket extending from an axially displaceable steering link 55. The ram cylinder 68 is anchored as at 68C to a part of the tractor chassis. The lever 54 has a pin and slot connection 85 with the steering link 55.

The operation of the hydraulic mechanism shown in FIGURE 8 will now be briefly described. In FIGURE 8 the mechanism is shown in a central position. It may be assumed that the pump 73 is running and is hence pumping hydraulic pressure medium towards the tank 71. The pressure of the gas cushion 72 reaches a particular point where the pressure medium supplied by the pump is returned through the by-pass including the pressure relief valve 75. Hydraulic pressure medium is supplied to the spool valve between the spools thereof, but this will be of no effect in the illustrated central position. Assuming now that the rod 51 is moved to the left, i.e. in the direction indicated by the arrow 83, then the lever 54 will be swung in the direction indicated by the arrow 92 about the pin and slot connection 85. The spool valve assembly 57 will now be raised with the result that the conduit 68A will be effectively opened and supplied with hydraulic pressure medium. Simultaneously the spool concerned will close the conduit 74B, and the other spool will move above the entrance to the conduit 68B whereby the latter will be effectively connected with the conduit 74A. Hence the upper side 93 of the ram cylinder will be connected with the pressure medium, whilst the lower side 86 will be connected with the reservoir tank 74. The ram piston 67 will now begin to move powerfully downwardly carrying with it the steering link 55. The latter moves the pin and slot connection 85 of the lever 54 downwardly, and hence resets the spool valve in the central position where no hydraulic medium will be further supplied to the ram cylinder 68. Hence the link 55 will have been powerfully moved by a distance depending upon the extent to which the rod 51 was originally moved in the direction 83. If the rod 51 is moved in the opposite direction 82, then the spool valve will be moved in the opposite direction from centre by virtue of a swinging movement of the lever 54 in the direction illustrated by the arrow 84 whereby the conduit 68B will be connected to the pressure side of the hydraulic supply whereas the conduit 68A will be connected to the return side. Hence the ram piston 67 will be moved powerfully upwards carrying with it the steering link 55 which is now moved in the direction 87, and which continues to move in such direction until the spool valve is reset. Thus the hydraulic mechanism shown in FIGURE 8 operates as a simple hydraulic power follow-up system.

As appears best from FIGURE 1, the steering link 55 extends over the whole length of the longitudinal chassis principal 1. At one end of the rod 55 it is pivotally connected with an arm 59 of a bell-crank lever having a further arm 60. The bell-crank lever is itself pivotally mounted on the chassis of the tractor. The free end of the arm 60 is pivotally connected to one end of a link 61 the other end of which is pivotally connected to a steering arm 62 for the ground wheel 5. In a similar way, the other end of the rod 55 is pivotally connected to one arm 63 of a bell-crank lever, the other arm 64 of which is pivotally connected to one end of a link 65, the other end of which is pivotally connected to a steering arm 66 for the other steerable ground wheel 6. It will be noted from FIGURE 1 that if the rod 55 is moved in the direction shown by the arrow 87 thereon, this will cause the ground wheel 5 to be turned with a steering movement in the direction indicated by the arrow 88. Simultaneously the steerable ground wheel 6 will be caused to turn with a steering movement in the direction indicated by the arrow 90.

Referring now once more to FIGURES 3 and 4, it will be noted that the seat structure has the frame members 14A downwardly extended at 14C to constitute a pair of depending legs. There is a further pair of legs 14D each of which is secured at its upper end to a frame member 14A, from whence the leg extends downwardly and forwardly. The lower ends of all the legs 14C and 14D pass beneath and are secured to a platform 76 which constitutes a footboard. Upon the footboard control pedals 77, 78 and 79 are pivotally arranged. Since the platform constituting the footboard moves with the seat structure when the latter is turned about the axis 17, it will be understood that the control pedals must be connected to the devices of the tractor which they control through the intermediary of flexible connecting means. Conveniently hydraulic connections are employed. Thus each of the pedals is arranged to vary the setting of a respective hydraulic mechanism 80 carried upon the platform 76, each of the hydraulic mechanisms 80 being connected by a flexible hose 81 with a device upon the tractor chassis which has to be controlled by the pedals.

In describing now how the tractor is steered, it will be assumed that the seat structure 9 is first in the setting illustrated in FIGURES 1, 2 and 3, i.e. the front and rear of the seat extend in a direction transverse to the longitudinal extent of the tractor. When the driver is seated in this position of the seat structure, it will be understood that he can easily look to his right or to his left and watch the action of an agricultural implement or implements being towed or pushed by the tractor. It will be supposed that the tractor is travelling in the direction indicated by the arrow 94 in FIGURE 1. If now the driver desires that the tractor shall turn to the right then he pulls both the control sticks 20 and 21 with the aid of the handles 27 and 28, towards him. Such a movement of the control sticks will cause the lower ends thereof to move in an opposite direction whereby the rod 31 as seen in FIGURE 6, will be moved to the left. The rod 31 can turn in the sleeve 41 but nevertheless the dashpot 42 will be rocked in an anticlockwise direction about the pin 34 as seen in FIGURE 6, the lower end of the lever 43 therefore being swung in the direction indicated by the arrow 82. The movement of the rod 31 will cause a variation in the distance between the axis of the rod 31 and the axis of the pin 34. This will not be of any consequence since the spring-loaded plunger can move within the dashpot to make a length compensation. The dashpot and plunger structure in fact functions as a simple link of variable length. Movement of the lever 43 in the direction 82 causes the rod 46 to be moved in a similar direction. With the aid of the hydraulic mechanism previously described with reference to FIGURE 8, the steering link 55 makes a corresponding powerful follow-up movement in the direction 87. Thus the steerable wheel 5 moves in the direction 88 and the steerable wheel 6 moves in the direction 90 and the tractor turns to the right. If the driver pushes the handles 27, 28 away from him then the steerable wheels 5 and 6 are turned in opposite directions and hence the tractor steers to the left. It will be noted that if the tractor is moving in the direction indicated at 95 in FIGURE 1, when the driver again pulls the handles 27 and 28 towards him, the tractor will steer towards the left and similarly when the driver pushes both the handles away from him the tractor will steer towards the right. In FIGURE 9 there is a diagram showing the control stick 20 in full lines in its forward position with respect to the driver and in dotted lines in its rearward position.

It will be realised that the axis of the pin 34 is fixed so that it lies always in the longitudinal direction of the tractor and hence steering movements to be imparted to the lever 43 must always be in a direction transverse to the longitudinal extent of the tractor. If now it is desired to change the setting of the seat structure 9 so that instead of having the transverse position so far considered, the seat structure has a longitudinal setting, then the seat structure is swung about the pivotal axis 17 and the locking pin 18 is brought into another one of the holes 19 in the plate 16. It will be supposed that a setting has been made where the driver will face in the direction of the arrow 95 shown in FIGURE 1. This corresponds to the position shown in FIGURE 4. In turning the seat structure to the position shown in FIGURE 4, the rod 31 will be swung through substantially 90°. The sleeve 41 will turn with the rod 31 and hence the plunger 37 will turn within the dashpot. If now the driver desires to steer the tractor to the left whilst the tractor is proceeding in the direction 95, then he simply grasps the handles 27 and 28 and moves both of them laterally in a direction towards his left. This motion will cause the rod 31 to be moved to the left as seen in FIGURE 4. Hence the lever 43 will again be rocked in the direction 82. In so moving the rod 31, it will be appreciated that the pin 40 will have to turn in the sleeve 39, but this it can freely do. The movement of the lever 43 in the direction indicated by the arrow 82 will cause the steering link 55 again to be moved in the direction 87, and for reasons previously explained, the tractor will steer to the left. If the handles 27 and 28 are moved by the driver laterally to his right, then the tractor will steer to the right since the lever 43 will now be rocked in the direction 83. It will be noted that no matter whether the seat structure is transversely or longitudinally arranged, the control sticks 20 and 21 are always moved in directions transverse to the longitudinal extent of the tractor. In FIGURE 10 there is a diagram like FIGURE 9, but showing the movements of the control sticks 20 and 21 when the seat structure is in a longitudinal setting.

It will be understood that no matter whether the seat structure faces in the direction indicated by FIGURE 4 or whether it faces in the direction indicated by the arrow 94 in FIGURE 1, the steering of the tractor, when it proceeds in the direction in which the driver is facing, will always be correctly related to the movement of the control sticks. Although two control sticks have been illustrated, it will be appreciated that in principle the same effect could be obtained with the aid of a single control stick.

In the described embodiment there are only three possible settings for the seat structure since there are only three holes 19 in the plate 16. It will be understood that if so desired there could be further holes 19 and hence further available settings. The seat structure can be arranged so as to turn through nearly 360°. It may for example be convenient to arrange that the driver can turn his seat to a position where he faces the ground wheel 7.

It will be noted that when the tractor is viewed in plan, the axis of rotation 17 about which the seat structure is adapted to turn, is located at about the centre of the turnable parts. Hence the space required for turning the seat structure will not be very much larger than the area enclosed by the boundary of such parts. Moreover since the centre of the movable seat structure coincides substantially with the axis about which it is turnable, it will be appreciated that the controls which must be operated by the driver and which do not turn with the seat structure, will at all times be reasonably near to the driver no matter what the setting is of the seat structure.

The arrangement of the seat structure described above is particularly useful where the tractor is intended to be driven in either of two directions of travel since the seat structure can be turned whereby the driver may appropriately face the direction in which the tractor is to travel. The transverse setting for the seat structure enables the driver to have a good view of the working of implements propelled by the tractor.

What we claim is:

1. A tractor comprising a frame supported on steerable ground wheel means, a driver's seat mounted on said frame so as to be rotatable about a substantially vertical axis, a control stick means mounted on said seat provided with means comprising a universal joint, a transmission mechanism coupling the control stick means with said steerable wheel means, said transmission mechanism comprising at least two parts, said parts being rotatable with respect to each other about a pivot axis, the first part being adapted to turn with the seat and the second part occupying a fixed position with respect to the frame when the seat is turned, said first part comprising a coupling means connected to said control stick means including a universal joint, said coupling means being rotatable about said pivot axis and slideable parallel to said pivot axis with respect to the second part of said transmission mechanism, whereby said seat and control stick means may be adjusted to different positions about vertical axes.

2. A tractor as claimed in claim 1, wherein said control stick means is mounted at a location remotely from the substantially vertical axis about which the seat is turnably adjustable, means coupling said control stick means with said coupling means including an element extending substantially parallel to said front side of the seat, a second universal joint, said element being connected with the coupling means through said second universal joint.

3. A tractor as claimed in claim 2, wherein means is provided for pivotally connecting the control stick means with said element whereby said control stick may pivot with respect to said element about an axis which extends substantially perpendicular to said front side of the seat.

4. A tractor as claimed in claim 1, wherein the seat includes an arm rest, said control stick means being located at the side of the seat and adjacent the front end of said arm rest.

5. A tractor as claimed in claim 2, wherein said control stick means comprises two control sticks arranged to be jointly movable for performing steering movements, said control sticks being disposed one on either side of said driver's seat and coupled with each other by said element to which they are pivotally connected including pivot axes for said sticks extending substantially perpendicular to the front side of said driver's seat.

6. A tractor as claimed in claim 1, wherein said second-named universal joint to which the control stick means is coupled with said coupling means, comprises two shafts, said shafts being at least substantially at right angles to each other.

7. A tractor as claimed in claim 6, wherein one of said shafts extends substantially parallel to said front side of the seat, and said other shaft extends substantially perpendicular to said front side of the seat.

8. A tractor as claimed in claim 1, wherein said coupling means includes means on the said second part of said transmission mechanism, said last-named means being adapted to turn about a fixed axis extending substantially parallel to the longitudinal axis of the tractor.

9. A tractor as claimed in claim 1, wherein said coupling means includes a dashpot and plunger system.

10. A tractor as claimed in claim 9, wherein said dashpot and plunger system includes a spring-loaded plunger and cylinder whereby said plunger is biased in one direction in said cylinder.

11. A tractor as claimed in claim 1, wherein said steerable ground wheel of the tractor is provided with means for movement about a substantially vertical axis whereby to perform a steering action, power-operated mechanism mounted on the tractor chassis and operatively connected to said ground wheel including a control device, said control device including means whereby its displacement in one direction or the other correspondingly causes said power-operated mechanism to impart a steering movement in one direction or the other, said transmission mechanism being arranged to extend from the control stick means to said control device whereby rocking of the control stick means will cause a corresponding movement of said control device.

12. A tractor as claimed in claim 11, wherein said power-operated mechanism includes a hydraulic ram, a hydraulic circuit, a reservoir tank, a pressure tank and a pump connected in circuit to each other, the said control device of the said power-operated mechanism further including valve means arranged to be moved in either direction away from a set position when said ram is stationary to cause the ram to be moved correspondingly in either direction, and whereby the movement of the ram operates to recenter said valve means whereby to obtain a hydraulic power follow-up system.

13. A tractor as claimed in claim 1, wherein a foot board is provided adjacent said driver's seat and means mounting said foot board for turning movements with said seat, said foot board having control pedal means for said tractor, said control pedal means being movable with said foot board.

References Cited in the file of this patent

UNITED STATES PATENTS

| | | |
|---|---|---|
| 2,384,890 | Coldwell | Sept. 18, 1945 |
| 2,833,367 | Pool et al. | May 6, 1958 |
| 2,949,162 | Davis | Aug. 16, 1960 |

FOREIGN PATENTS

| | | |
|---|---|---|
| 554,634 | Italy | Jan. 14, 1957 |
| 1,057,583 | France | Mar. 9, 1954 |